United States Patent
Offenhartz

(10) Patent No.: US 10,348,855 B2
(45) Date of Patent: *Jul. 9, 2019

(54) INTEGRATING COMPLEX DATA STRUCTURES IN COLLABORATION ENVIRONMENTS

(71) Applicant: SuccessFactors, Inc., South San Francisco, CA (US)

(72) Inventor: John Offenhartz, San Francisco, CA (US)

(73) Assignee: Success Factors, Inc., South San Francisco, CA (US)

( * ) Notice: Subject to any disclaimer, the term of this patent is extended or adjusted under 35 U.S.C. 154(b) by 99 days.

This patent is subject to a terminal disclaimer.

(21) Appl. No.: 15/605,304

(22) Filed: May 25, 2017

(65) Prior Publication Data

US 2017/0264706 A1    Sep. 14, 2017

Related U.S. Application Data

(63) Continuation of application No. 14/079,348, filed on Nov. 13, 2013, now Pat. No. 9,692,850.

(51) Int. Cl.
*G06Q 10/10* (2012.01)
*H04L 29/08* (2006.01)

(52) U.S. Cl.
CPC ........ *H04L 67/306* (2013.01); *H04L 67/1095* (2013.01); *G06Q 10/101* (2013.01)

(58) Field of Classification Search
CPC .. H04L 67/306; H04L 67/1095; G06Q 10/101

USPC .......................................................... 709/205
See application file for complete search history.

(56) References Cited

U.S. PATENT DOCUMENTS

| | | |
|---|---|---|
| 6,157,915 A | 12/2000 | Bhaskaran et al. |
| 6,789,252 B1 | 9/2004 | Burke et al. |
| 7,082,430 B1 | 7/2006 | Danielsen et al. |
| 7,219,107 B2 | 5/2007 | Beringer |
| 7,996,462 B2 | 8/2011 | Degenhardt et al. |
| 7,996,466 B2 | 8/2011 | Wu et al. |
| 8,095,472 B2 | 1/2012 | Springborn et al. |
| 8,363,819 B2 | 1/2013 | Zgardovski et al. |
| 8,407,297 B2 | 3/2013 | Schmidt-Karaca et al. |
| 8,589,263 B2 | 11/2013 | Doenig et al. |
| 8,977,698 B2 | 3/2015 | Veda |
| 2004/0049481 A1 | 3/2004 | Blevens |
| 2004/0230447 A1 | 11/2004 | Schwerin-Wenzel et al. |
| 2007/0088741 A1 | 4/2007 | Brooks et al. |
| 2007/0226032 A1* | 9/2007 | White .................... G06Q 10/10 705/300 |

(Continued)

*Primary Examiner* — David R Lazaro
*Assistant Examiner* — Zi Ye
(74) *Attorney, Agent, or Firm* — Fountainhead Law Group P.C.

(57) ABSTRACT

Various embodiments of the present disclosure provide improved mechanisms and techniques for integrating complex data structures with collaboration environments. Various embodiments involve creating a collaboration group around a selected complex data structure, and including the selected complex data structure as well one or more other related complex data structures in the collaboration group. In some embodiments, an object consumption definition is applied to metadata associated with the complex data structure to determine the related complex data structures.

20 Claims, 7 Drawing Sheets

(56) References Cited

U.S. PATENT DOCUMENTS

| | | |
|---|---|---|
| 2007/0250784 A1 | 10/2007 | Riley et al. |
| 2010/0179915 A1 | 7/2010 | Nastacio |
| 2011/0119598 A1 | 5/2011 | Traylor |
| 2012/0078802 A1 | 3/2012 | Kieselbach |
| 2012/0166459 A1 | 6/2012 | Ritter et al. |
| 2012/0246115 A1* | 9/2012 | King .................. G06F 21/6227 707/626 |
| 2012/0260155 A1 | 10/2012 | Krieger et al. |
| 2013/0036115 A1 | 2/2013 | Schwarz et al. |
| 2014/0013451 A1* | 1/2014 | Kulka .................... G06F 21/14 726/29 |
| 2014/0136958 A1 | 5/2014 | Scattergood et al. |
| 2015/0134706 A1 | 5/2015 | Offenhartz |
| 2015/0134746 A1 | 5/2015 | Offenhartz |

* cited by examiner

INTEGRATING COMPLEX DATA STRUCTURES IN COLLABORATION ENVIRONMENTS

CROSS-REFERENCE TO RELATED APPLICATION

The patent application is a Continuation of U.S. patent application Ser. No. 14/079,348, filed Nov. 13, 2013 and incorporated by reference in its entirety herein for all purposes.

BACKGROUND

The present disclosure generally relates to computer programming. More specifically, the disclosure relates to integrating complex data structures into collaboration environments.

Unless otherwise indicated herein, the approaches described in this section are not prior art to the claims in this application and are not admitted to be prior art by inclusion in this section.

Enterprise collaboration software tools which provide computer based working environments where members can interact and share information are becoming increasingly used. (Such tools are also sometimes referred to as enterprise social software, among other things.) In such collaboration environments, group members can often share documents, see actions taken by other members of the group relating to the group's purpose, interact with one another, vote on issues, keep track of historical data regarding a project, etc. Such collaboration tools seek to facilitate the communication of ideas, and optimize the members' ability to work together to solve problems.

Frequently, it can be useful to include a complex data structure retrieved from another system in a collaboration environment. One example of such complex data structures are business objects generated by a Customer Relations Management (CRM) system. Computerized CRM systems generally include technology that can organize and maintain information about sales, marketing, and customer service, for example. CRM systems provide powerful capabilities in terms of storing large amounts of data, and performing discrete, predetermined tasks with respect to such data. However, they generally do not provide many features for facilitating interactions between different employees working together to solve a problem, for example.

Traditionally, where integration of a collaboration system with other systems has been attempted, it has taken the form of either a "siloed" or "side by side" approach, where either data (e.g., business objects or documents) need to be manually brought in, on an object by object basis, into the collaboration environment or where the collaboration environment is attached to the other system. In a silo approach, a collaboration system and an external system can send and receive data from one another but may be otherwise impermeable to each other. In a side by side approach, more direct access is provided between the systems, but the interactions may be limited in scope and sophistication.

It would be advantageous to provide improved mechanisms for integrating complex data structures into collaboration environments.

BRIEF SUMMARY

Various embodiments of the present disclosure provide for improved techniques and mechanisms for integrating complex data structures into collaboration environments.

According to various embodiments, a request to create a collaboration group around a first complex data structure is received. The first complex data structure, and metadata associated with the first complex data structure, is retrieved from an external system. An object consumption definition for an object type corresponding to the first complex data structure is determined. The object consumption definition is applied to the metadata for the first complex data structure to determine one or more complex data structures having a relationship to the first complex data structure. A collaboration group is created around the first complex data structure, the collaboration group including the determined one or more related complex data structures, wherein the collaboration group is associated with a collaboration environment.

According to various embodiments, the one or more related complex data structures are of a first object type. In addition, a hierarchy for a data structure including the first complex data structure is determined, where the hierarchy includes the first complex data structure and the one or more related complex data structures of the first object type. The one or more related complex data structures of the first object type are associated with the collaboration group.

According to various embodiments, one or more complex data structures of a second object type that are part of the hierarchy, and have a relationship to the first complex data structure, are determined. The one or more related complex data structures of the second object type are determined to be related to the first complex data structure by applying the object consumption definition. The one or more related complex data structures of the second object type are associated with the collaboration group.

According to various embodiments, in a user interface of the collaboration environment, a listing of the one or more related complex data structures is provided. The listing includes, for each complex data structure, a complex data structure icon which when selected allows a user to obtain a quick view of the selected complex data structure.

According to various embodiments, a create icon is provided in the quick view of the selected complex data structure that when selected allows a user to create a new collaboration group around the selected complex data structure.

According to various embodiments, a navigate icon is provided in the quick view of the selected complex data structure that when selected allows a user to navigate to a collaboration group for the selected complex data structure.

According to various embodiments, a share icon is provided in the quick view of the selected complex data structure that when selected allows a user to associate the selected complex data structure with a second collaboration group.

According to various embodiments, in a user interface of the collaboration environment, a quick view of a selected complex data structure is provided. The quick view providing both a create icon and a navigate icon. The create icon when selected allows a user to create a new collaboration group around the selected complex data structure, and the navigate icon when selected allows a user to navigate to the selected complex data structure.

According to various embodiments, in a user interface of the collaboration environment, an activity feed is provided of actions taken by members of the collaboration group. The activity feed includes, for each action relating to a complex data structure, a quick view icon for the complex data structure that when selected allows a user to obtain a quick view of the complex data structure.

According to various embodiments, the quick view of a selected complex data structure identifies one or more collaboration groups associated with the selected complex data structure. In addition, in some embodiments, the quick view provides a navigate icon for each such collaboration group that when selected allows a user to navigate to the selected collaboration group.

According to various embodiments, in a user interface of the collaboration environment, a listing of one or more object type categories is provided, each such category associated with one or more complex data structures included in the collaboration group. Each of the object type categories is associated with an icon that when selected allows a user to obtain a view of the complex data structures included in the selected object type category.

According to various embodiments, the one or more related complex data structures are displayed in a user interface of the collaboration environment according to visual layout that is determined by a template associated with the determined object consumption definition.

Various embodiments of the present disclosure pertain to a computer system having one or more processors, and a memory, that are configured to perform one or more of the above described operations. Various other embodiments pertain to at least one computer readable storage medium having computer program instructions stored thereon that are arranged to perform one or more of the above described operations when executed by a processor.

The following detailed description and accompanying drawings provide a better understanding of the nature and advantages of various embodiments of the present disclosure.

BRIEF DESCRIPTION OF THE DRAWINGS

Embodiments of the present disclosure are illustrated by the figures of the accompanying drawings which are meant to be exemplary and not limiting, in which like references refer to like or corresponding parts, and in which.

DETAILED DESCRIPTION

Figure 1:
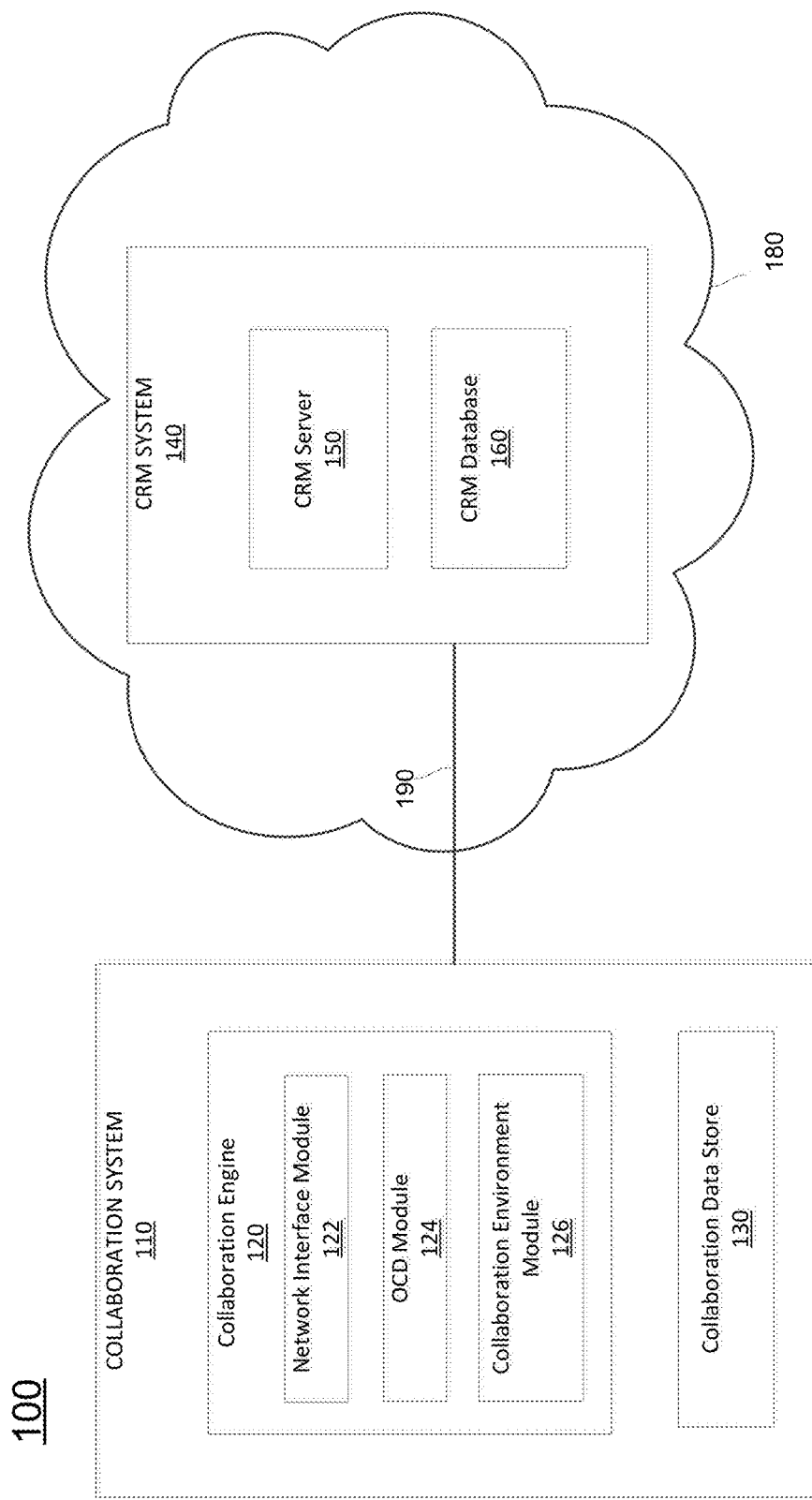
FIG. 1 is a block diagram presenting a network topology in accordance with one embodiment of the present disclosure.

Described herein are improved techniques and systems for integrating complex data structures into collaboration environments. In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

Embodiments of a method and system for improved techniques and systems for integrating complex data structures into collaboration environments, in accordance with the present disclosure, are described herein with reference to the drawings in FIGS. 1 through 7.

Various embodiments of the present disclosure provide techniques for improved integration of complex data structures (e.g., business objects) into a collaboration environment, where the complex data structures obtained from an external application system. External applications, such as CRM applications, for which integration with a collaboration system is desired will sometimes be referred to as "external systems" herein for ease of discussion.

Collaboration systems have pulled in data from application systems in the past. However, typically, they have not worked with complex data structures, such as business objects and the relationships between these business objects. Further, even where data was shared, interactions between collaboration environments and external systems have frequently been limited.

Various embodiments seek to provide more sophisticated techniques for integrating business applications with collaboration environments. Among other things, various embodiments provide techniques for maintaining ongoing communications between a collaboration environment and a business application such that faster and more efficient data usage and better decision making around business objects can occur. In some embodiments, such ongoing linkage involves sharing information regarding actions taken with respect to a business object (either in the collaboration system or the external system) with the other system.

Further, various embodiments address the challenges involved in integrating complex data structures into a collaboration environment, by mirroring the structure of a complex data structure in the collaboration environment. In this way, productive use is made of relationships already established between different pieces of data. That is, in some embodiments, a collaboration system relies on the relationship between objects in the application system it is integrating with to determine relationships in the collaboration system. Where the business object is part of a hierarchical data structure, for example, its organized hierarchy may be mirrored in the collaboration space, such that structured data access to the business object is enabled, as further described herein.

As an example of a hierarchical structure, a CRM system may provide information regarding various customer accounts. Each customer account may have information associated with it concerning the company's market capitalization, its sales, the founder's name, his or her contact telephone number or email address, etc. Each account may also have related subgroups of information, for example, a subgroup for opportunities for further sales to that account, and a subgroup for service requests relating to presently pending complaints from the customer of that account, for example. Data for the customer account may be organized and stored in a hierarchical fashion. As noted above, the structure of the hierarchy may be described in associations or relationship metadata stored in the business object.

Further, various embodiments provide improved mechanisms for creating a new collaboration group around a particular data record, and for pulling in other business objects (which share a relationship with the particular data record) into that collaboration group. Auto-population of a collaboration group with related business objects is achieved, in various embodiments, by applying an object consumption definitions to metadata associated with the complex data.

In addition, some embodiments provide improved mechanisms for identifying and navigating to other collaboration groups which may be of interest to a user. Additionally, various embodiments provide techniques for simplifying the process of a user sharing (i.e., adding) a business object to a preexisting collaboration group. Such mechanisms provide increased likelihood that effective use is made of available data in an application system.

Additionally, in various embodiments, improved tools are provided for viewing, editing, and collaborating around a business object, in a collaboration space or environment. In some embodiments, tools are provided in a user interface for more readily viewing key aspects of a business object using templates applied on a per object type basis and derived from corresponding object consumption definitions.

Advantages of the present disclosure include providing faster and easier access to complex data objects in a collaboration environment. Further advantages include facilitating a user experience by integrating a collaboration environment with a business application such that transition between the two systems may appear to be almost seamless to a user of one of the systems, and one system may appear to be a part of the other system.

As used herein, the term "business object" is used to refer to programming objects used in programming the software that relates to a particular thing in a real world context. A business object, for example, may be used to contain information relating to a customer account. Whereas a computer program may implement classes (which typically result in programming objects, such as business objects, managing or executing behaviors), a business object usually does nothing itself but instead holds a set of instance variables or properties (also known as attributes) and associations with other business objects, weaving a map of objects representing the real world relationships. The "attributes" may define features of the thing which the business object is related to. The "associations" may define a business object's relationship to other business objects.

In general, a business object is a code construct (e.g., a data structure) that, as noted above, corresponds directly to a thing in the real world, and a company uses software (e.g., a computer program) to manipulate the business object as real-world activities take place that are related to the thing. For example, when a sales order is fulfilled, a sales order business object may be altered to represent data reflecting that real world event.

The business object encapsulates the business logic related to the thing, and encapsulates the data that is required by the logic and also describes, defines, makes up, is contained by, or is associated with the thing. In general, the "thing" is recognizable to a non-technical person familiar with the business, like the users, business analysts, etc. Each object has data that describes or is attributed to the object and methods that make decisions based on that data. For example, a customer account BO may have a customer name attribute and market capitalization attribute (data), and may also have related methods such as create, modify and read for performing actions relating to the BO. Things may be tangible objects with real-world meanings, or may be conceptual objects that relate to the company and its processes.

As noted above, the general term "business object" may be more precisely stated by using two other terms: business object instance and business object type. A business object instance refers to a specific business object, often including specific data, that is processed by the data processing system; whereas a business object type refers to a general class of business object which may itself serve as a template for business object instances. Example business object types include a purchase order, a sales order, etc.; corresponding instances include a specific purchase order with specific data, a specific sales order with specific data, etc. Embodiments use both business object types as well as business object instances; often the general term "business object" may be used to describe both since the more precise term is clear from the context.

As described above, various embodiments of the present disclosure provide a system or method for integrating complex data structures, such as business objects obtained from other systems, into a collaboration environment. It will be understood, however, that the disclosure is not restricted to use with collaboration systems, but may be used in conjunction with facilitating consumption of any complex data structure where a more automated process for retrieving collections of related data, and working with such data, would be useful.

Further, techniques described herein for providing integration between a collaboration system and another system, also may be extended to any context where a closer integration of two systems which are sharing data would be useful.

Embodiments for a collaboration system with improved integration with an external system may be implemented in a wide variety of configurations. Turning to FIG. 1, a network topology comprising hardware and software components configured according to one embodiment of the present disclosure is illustrated. The network topology presented comprises a collaboration system 110, including a collaboration engine 120 and a collaboration data store 130, connected to a CRM system 140. CRM system 140 comprises a CRM server 150 and a CRM database 160. CRM system 140 is located in a network 180. Both the CRM system 140 and collaboration system 110 may comprises one or more servers, and may include any suitable modules for integrating the systems, as described further herein. Collaboration system 110 and CRM system 140 are connected by a network link or links 190. Embodiments of the above system may be implemented in a wide variety of network environments including, for example, Ethernet networks, TCP/IP-based networks, telecommunications networks, and wireless networks, etc., or a combination of such networks.

Note that while in the illustrated embodiment the CRM system 130 and collaboration system 110 are part of different networks. In other embodiments, they may be part of a same network. Additionally, in some embodiments one or both of the collaboration server and the CRM system may be implemented using a distributed system of servers and storage structures over one or more networks.

Collaboration engine 120 shown in FIG. 1, includes a network interface module 122, an object consumption definition (OCD) module 124, and a collaboration environment module 126, which operate together to retrieve business objects, and collections of business objects, from CRM system 140, and provide the business objects in a ordered manner for displaying to a user in a collaboration environment. CRM system 140 may be accessed by collaboration system 110 through a connection to the Internet, for example.

According to various embodiments, collaboration engine 120 uses a remote access API referred to as Open Data Protocol (OData), which is a standardized data access protocol for data access and consuming data, to retrieve data from CRM system 140. Using OData, collaboration engine 120 pulls in business objects from CRM system 140 by making API calls into CRM system 140. It then introspects those objects, and makes those objects visible inside of collaboration system 110, again using OData.

OData returns data in Atom structures; such a structures acts as the envelope that contains the data returned from each OData request. Importantly, this mechanism allows a system using OData to access a variety of different data stores without needing to know in advance the characteristics of the data in those data stores, or how to unpack or display it. OData provides full metadata of a data source, including information regarding the full structure of the data available from a given OData service, as well as data types, relationships, viewers etc.

Collaboration system 110 may be located in a private network associated with a particular company, for example, or it may be located in a public network. CRM system 140 is located in a network 180, which may also be a private network or a public network. CRM system 140 may perform customer relations functions including functions relating to keeping track of accounts, managing communications with customers, and monitoring the success of marketing campaigns, among other things.

As noted above, collaboration engine 120 includes network interface module 122, object consumption definition (OCD) module 124, and collaboration environment module 126, which operate together to retrieve business objects, and collections of business objects, from CRM system 140, and provide mechanisms for working with the business objects to a user.

As noted above, according to various embodiments, network interface module 122 requests and receives business objects and associated metadata from CRM system 140 over network link 190 using the OData protocol.

According to one embodiment, after a requested business object and related metadata have been obtained from CRM system 140, object consumption definition (OCD) module 124 determines whether the requested business object has any related business objects, and, if so, whether and which of those other records should be retrieved.

In effect, as discussed further below, the metadata allows OCD module 124 to reconstruct the hierarchy of business objects in CRM system 140. The OCD module then applies the object consumption definition that corresponds to the data type of the business object in order to determine, based on that hierarchy, which if any related business objects to pull into the collaboration environment. Object consumption definitions are defined on a per object type basis. For each object type, a system can define a different way to consume the data. For example, product data objects may have a different object consumption definition than account data objects.

It will be understood that the OCD rules could have a variety of different content and could take a variety of different forms.

Through such mechanisms, collaboration system 110 is able to retrieve collections of related business objects automatically, and to specify the scope of the records to retrieve using the OCD definitions.

In the embodiment illustrated in FIG. 1, once OCD module has retrieved any appropriate related business objects, the business object references are saved to collaboration data store 130 and information regarding the business object(s) is also provided to collaboration environment module 126.

Collaboration environment module 126 is the module responsible for actually creating the collaboration spaces/environments in which members of collaboration groups share information and make decisions, for example. The collaboration group selected by a user will be the one whose interface is displayed in the screen of a computing device being utilized by the user to access the collaboration tool. It is contemplated that a wide variety of computing devices could be used for this purpose including a desktop computer, a laptop computer, a tablet, or a mobile device, etc.

As discussed further below, a collaboration space for a collaboration group can include a number of different features, as further described herein. Implementations are contemplated in which business objects can be presented to members of a collaboration group in a variety of different ways that improve the likelihood of efficient use of data.

Figure 2:
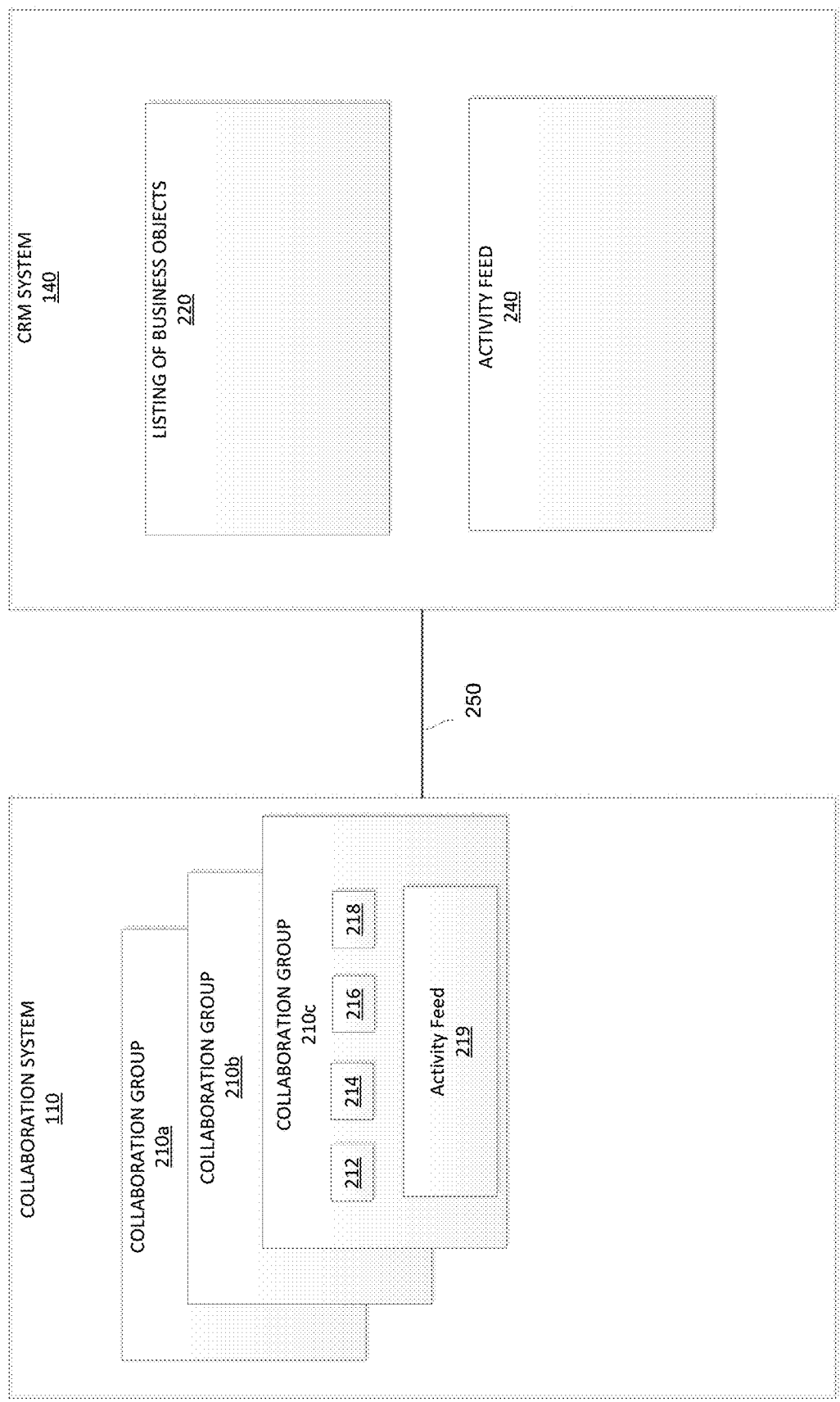
FIG. 2 is a diagrammatic representation of interactions between a collaboration system and an external system in accordance with one embodiment of the present disclosure.

FIG. 2 is a diagrammatic representation showing interactions between collaboration system 110 and CRM system 140, according to various embodiments of the present disclosure. FIG. 2 illustrates such interactions with reference to collaboration system 110 and CRM 140 of FIG. 1, but it will be understood that other embodiments may be implemented with different system configurations or with different network contexts, while still reflecting the spirit behind various embodiments of the present disclosure.

As illustrated in FIG. 2, collaboration system 110 includes three collaboration group user interfaces 210a, 210b, and 210c. Collaboration group interface 210c is pictured in front, but it will be understood that each of the collaboration group interfaces will in practice have has similar components.

As depicted in FIG. 2, a collaboration group interface 210c includes certain tools for use by members of a collaboration group associated with that interface. Such associated collaboration group will also sometimes be referred to as 210c below for ease of discussion.

As shown, the user interface for collaboration group 210c includes an icon 212 for files, such files may include Microsoft Word or Adobe PDF documents, or documents in other formats, for example. The interface for collaboration group 210c further includes an icon 214 for business tools, such business tools might include, for example, email, word processing or other programs or tools. The interface for collaboration group 210c further includes an icon 216 for forums and Q/A. This icon may provide quick and easy access to different resources such as a Q/A component and general information forums.

The interface for collaboration group 210c includes an icon 218 for references and visualizations of business objects associated with the collaboration group. Such business objects are the ones whose integration into the collaboration environment is discussed herein.

Finally, the interface for collaboration group 210c includes an activity feed 219 that provides up to date information concerning activities recently performed by members of the group, including actions taken with regard to business objects associated with that collaboration group, among other things. For example, the activity feed might note that a member posted a video, or a quote relating to the problem to be solved. Another member might post a customer satisfaction survey, another member might annotate a document or a business object.

In some embodiments, such activity feed 219 may also provide information concerning activities performed on the business objects by someone working in CRM system 140, such as, for example, modifying business objects, as further discussed herein.

According to various embodiments, mechanisms are provided for maintaining a two way linkage between CRM system 140 and collaboration system 110, such that, for example, a user in a collaboration environment/space (e.g., a member of a group created around a particular business object) of collaboration system 110, is able to see (e.g., through an activity feed) actions being performed on a business object in the external system (e.g., CRM system), and, conversely, a user in the external system is enabled to see (e.g., through an activity feed in the external system) actions being performed in a collaboration group formed around that business object.

In various embodiments, where changes are made to the business object in the external system (e.g., CRM system 140), the linkage mechanisms allow collaboration system 110 to automatically be notified of the changes, and for a revised copy of the business object to be sent to collaboration system 110, and for the changes to be automatically be reflected in the business object in the collaboration environment.

Similarly, where a business object is added to CRM system 140 that shares a relationship to a business object already pulled into a collaboration group in collaboration system 110, the collaboration group at issue will be given a copy of the business object to include in the collaboration group.

Further, in various embodiments, such two way linkage may enable users to experience the separate systems as being one system. That is, in various embodiments, a first system may appear to be contained within the second system, in terms of user experience.

Further, various embodiments provide that data relating to the collaboration group—such as, actions taken and decisions made in the collaboration group, along with communications and associated documents—are maintained, and retained in association with the business object around which the collaboration group was formed. Such associations and data may be maintained even after the collaboration group itself has ended.

Such mechanisms provide for a historical record of a past decision making process in relation to a business object. Such information may be useful where a same or similar problem recurs in the future. Typically piecing together information regarding a decision making process requires an arduous process of collecting relevant emails or other communications etc. Such mechanisms provide for efficient recycling of past deliberations and quick identification of who was involved, and how a decision was made.

Further, mechanisms are provided such that from one environment (e.g., collaboration environment), the user may easily switch to being in the other environment (e.g. CRM environment) and may thereby view data relating to the same business object, from the perspective of the other system, as well as having available whatever other functionality or tools are available in the other system.

As depicted in FIG. 2 on the right hand side, CRM system 140 includes a user interface that provides a listing 220 of business objects in the CRM database, and an activity feed 240. The activity feed 240 in CRM system 140 is configured to provide information regarding activities conducted in a collaboration group of collaboration system 110 that was formed around a CRM business object. In some embodiments, whichever business object is selected in the listing 229 of business objects, a view of the activities of a collaboration group corresponding to the selected business object, will be displayed in activity feed 240.

Such activity feed 240 may also provide information concerning activities performed on the business objects within CRM system 140 as well, in some embodiments.

Accordingly, in the link maintained between CRM system 140 and collaboration group 210c, information is pushed from CRM system 140 to collaboration group 210c concerning updates or modifications made to business objects in CRM system 140.

This mechanism may have two components: (1) updates about business object changes are pushed to the activity feed 219 for collaboration group 210c of collaboration system 110, so members of that group are aware of updates made to business objects associated with that group. And (2) a copy of modified versions of business object may be provided to collaboration system 110 to replace the previous version of the record in collaboration system 110's business object repository.

In essence, aspects of collaboration system 110 are being integrated into external system 140. People using CRM system 140 can see activity feed 240, while information for the activity feed is coming, at least in part, from collaboration system 110.

Additionally, in the system depicted in FIG. 2, in the opposite direction, using the link 250 between collaboration system 110 (and thus collaboration group 210c) and CRM system 110, collaboration system 110 may provide CRM system 140 with information regarding actions taken by members of collaboration group 210c regarding CRM business objects associated with collaboration group 210c. This information may be displayed in activity feed 240 of CRM system 140.

Various embodiments provide improved techniques for "creating" collaboration groups around business objects. As noted above, in some embodiments, in response to such a request, not only does collaboration system 110 pull in the requested business object, it also pulls in other business objects related to the requested business object. Such a group of business objects may be referred to as a "collection" of business objects herein. Which business objects to include in the group may be determined, as noted above, with reference to a set of object consumption definitions (OCDs) provided by a system administrator, for example.

As an example, a business object may exist in CRM system 140 that pertains to a potential sales opportunity. When something threatens to derail the sale, it may be useful to form a collaboration group in collaboration system 110 to review the situation and come up with solutions. In such a situation, in various embodiments, a user may create a collaboration group "around" an appropriate opportunity business-record using features of the present disclosure. Mechanisms for accessing such features may be made available both in collaboration environments of collaboration system 110, as well as in user interfaces of CRM system 140, as discussed further herein.

Figure 3:
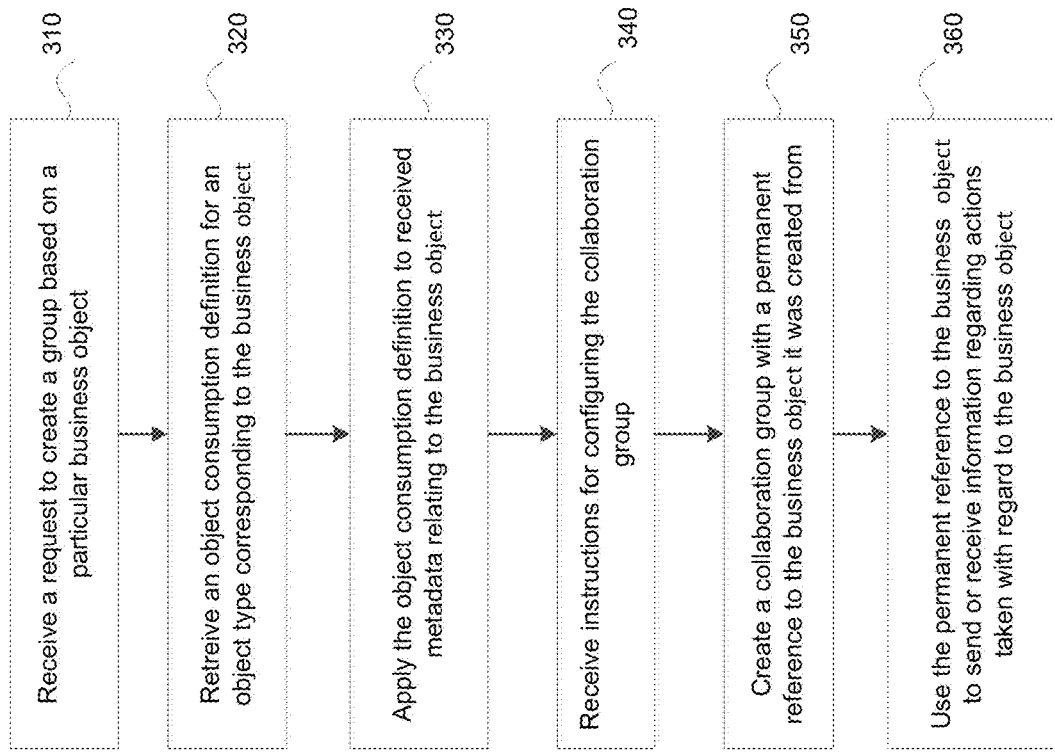
FIG. 3 is a diagrammatic representation of mechanisms for working with business objects in a collaboration environment in accordance with one embodiment of the present disclosure.

FIG. 3 is a flow diagram illustrating a procedure for creating a collaboration group around a business object in accordance with one embodiment of the present disclosure. It will be understood that the sequence of steps depicted in FIG. 3 is intended to provide one example embodiment.

Other embodiments with a different sequence of steps, or with particular steps left out, may still reflect the spirit behind various embodiments of the present disclosure.

In step 310, a request to create a group based on a particular business object is received, the request containing the business object as well as metadata relating to the record.

In step 320, an object consumption definition for a data type corresponding to the data type of the business object may be retrieved. Object consumption definitions provide a metadata driven set of definitions that, on a per-object-type basis, define a set of rules for creating collaboration groups around instances of various object types.

An object consumption definition may include rules for determining what group templates can be used for an object type, as well as rules relating to how to auto populate a collaboration group with dynamic collections of business objects related to the business object around which the group is being formed.

As one example, when a customer-account business object is selected, an OCD module such as element 124 may determine that the business object is an "account" record, then it will look up in the appropriate OCD definition what action should be taken with respect to such records. For example, the applicable rule might say that such a record has related sub nodes which should be retrieved. Then the OCD module would retrieve the sub nodes. One sub node may consist of opportunities for that account. Another sub node may consist of service requests.

All of such determinations and actions may be performed automatically without requiring any user involvement. One benefit of using OCD definitions with a self-describing API protocol such as OData is that a system can work with different types of data without needing to know everything about the data beforehand.

In step 330, the object consumption definition is applied to the received metadata.

In step 340, instructions for configuring the collaboration group may be received. For example, a user may input such instructions using a wizard or work flow that prompts the user to configure various aspects of the collaboration group before creation. Such configurations may include a name for the collaboration group, privacy settings, template settings controlling aspects of the collaboration group's behavior inside of collaboration system 110, etc.

In step 350, a group may be created within collaboration system 110 with a permanent reference to the business object it was created from. After creation, the collaboration group may exist within collaboration system 110 with a permanent reference to the business object it was created from.

The collaboration group may also contain dynamically retrieved collections of business objects that are related to the originating business object, as noted above.

In addition, when a quick view of the business object is obtained by a user through any of the below described mechanisms for obtaining a quick view, the quick view may also indicate that a collaboration group x, was formed around the business object. Further, the collaboration group may be configured to display business objects according to visual layouts as defined by the collaboration group's templates as determined by the applicable object consumption definition for the data type of its base business object, for example.

In step 360, using a link maintained between CRM system 140 and collaboration group 210c, information is sent to and received from CRM system 140 regarding actions taken with regard to the business object (in CRM system 140 or in collaboration system 110).

In various embodiments, as illustrated by the embodiment depicted in FIG. 3, by defining a simple set of rules for how any given object, or collection of objects is to be handled, collaboration system 110 provides mechanisms for letting users quickly create groups for collaborating around any given business object or collection of business objects. It provides a user with the ability to make a selection indicating they want a collaboration group to be created around a particular business object, and have an automated way inside of collaboration system 110 to create a collaboration space.

Additionally, some embodiments provide a feature that once the new collaboration group has been formed, a user in CRM system 140 is given an option to click on a link that takes them into collaboration system 110, so that they can immediately be inside of the collaboration group that they created in CRM system 140.

Figure 4:
FIG. 4 is a flow diagram illustrating a procedure for creating a collaboration group around a business object from an external system in accordance with one embodiment of the present disclosure.

FIG. 4 illustrates a diagrammatic representation of a user interface showing mechanisms for working with business objects in a collaboration space/environment of collaboration system 110.

FIG. 4 shows a user interface 400 containing a number of elements. User interface 400 is an interface such as might appear on a user's computing device when the user accesses a particular collaboration group of collaboration system 110. The elements 410, 420, 430, 440, and 450 relate to icons on a user interface that allow a user to obtain more information regarding the business objects associated with the collaboration group.

According to the embodiment illustrated in FIG. 4, "Business objects Details" icon 410 when selected, shows in the right hand pane 460 of user interface 400 a high level view predetermined by a template, including some specific details about the business object around which the collaboration group was formed, and also identifying related business objects, as well as providing links to a set of business tools and documents in the collaboration group.

"Business objects Overview" icon 420 when selected, shows in the right hand pane 460 detailed information about the business object around which the collaboration group was formed, as well as an activity feed showing actions taken by members of the collaboration group, and perhaps also users of CRM system 140 from which the business object was obtained, regarding the business object.

"Related Records Type A" icon 430 when selected, shows in the right hand pane 460 an automatically populated and dynamic list of business objects of a certain type. This list will include business objects which are related to the business object around which the collaboration group was formed. Further, the listed business objects will all be of one indicated type. For example, they may all be "opportunity" business objects.

This list is automatically populated in the sense that collaboration module 126 determines which items to include in this based on a hierarchy of a business object's structure that it obtains from OCD module 124, which in turn determines the information based on a review of metadata associated with the business object.

The list is dynamic in the sense that the two way linkage mentioned above maintained between collaboration system 110 and CRM system 140 permits the list to be updated when additional business objects of object type A are added to the CRM database.

"Related Records Type B" icon 440 when selected, shows in the right hand pane 460 an automatically populated and dynamic list of business objects of a second type, this type being different from the object type for "Related Records Type A". For example, the object type may be "service request" business objects.

"Shared Records Type C" icon 430 when selected, shows in the right hand pane 460 a list of business objects that have been shared to the group manually by users. This means that a member of the collaboration group has specifically requested that the collaboration environment import these business objects into the member's collaboration group even though there is no relationship between the record and the business object around which the collaboration group was formed. These business objects are not automatically and dynamically brought into the collaboration group through operations performed by the OCD module, for example, by applying OCD definitions to determine which related business objects to bring into the collaboration group. When a "shared record" is brought in it is included in a collection for "shared records"

As one example, a collaboration group might be formed to research issues and resolve problems relating to "at risk" opportunities. In this case, such business objects may not necessarily have any structural relationship to each other, but yet a positive purpose would be served by collecting all such at-risk-opportunities business objects into a common collaboration group. Accordingly, an object consumption definition could be defined for such a group that says that whenever another collaboration group is created (in collaboration system 110) from one of those at risk opportunities, share that opportunity with the at-risk opportunities group.

Figure 5:
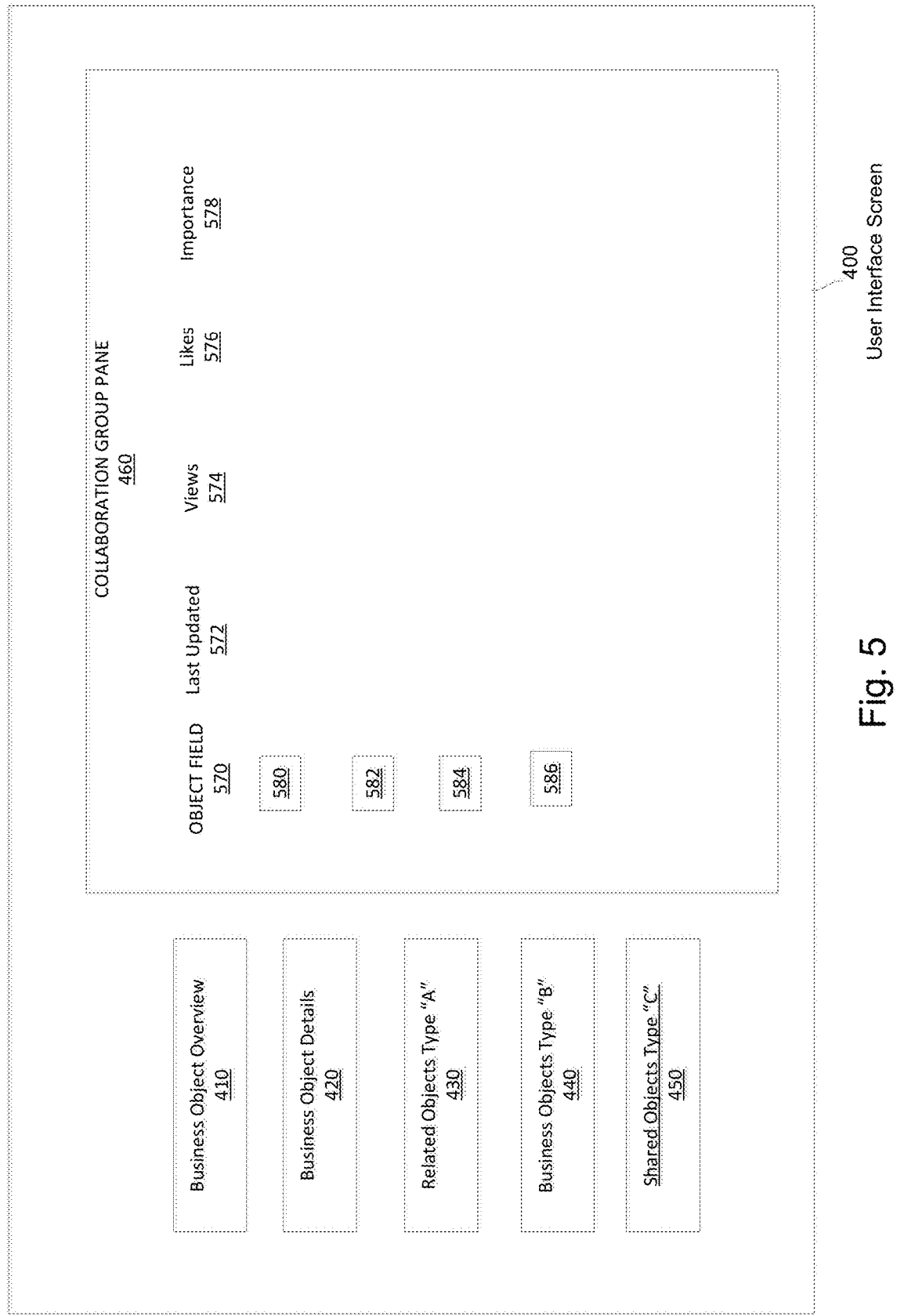
FIG. 5 is a flow diagram illustrating a procedure for integrating business objects from an external system into a collaboration environment in accordance with one embodiment of the present disclosure.

FIG. 5 illustrates a diagrammatic representation showing more detail regarding the user interface shown in FIG. 4. Specifically, it illustrates some of the elements that might appear in the collaboration group pane 460 when one of the related records icons 430 or 440 are selected.

As shown in FIG. 5, when the "Related Records Type A" icon 430 is selected, the right hand pane 460 may display icons (for example, icons 580, 582, 584, and 586) for each of the business objects in this collection under an object field 570 on the left hand side of the collaboration group pane. The particular business object may be identified by providing text description of the business object, for example, the text may be taken from the content of the business object itself. Further, display pane 460 may include a number of other fields as well. For example, it may include a field for the date that the record was last updated 572, the number of views 574 of that business object, the number of "likes" 576 submitted for that business object, and an importance level 578 of the business object as input by a moderator or group member, for example. Other fields may also be added that may be of useful to a collaboration system. In some embodiments, what fields are shown and rules for sorting the information shown in this list view, as well as possibly predefined filters, may be determined based on a combination of the relevant object consumption definition and annotations relating to an underlying business object interface endpoint.

When a user selects one of the business object icons 580, 582, 584, and 586, a detailed view of the business object at issue may be displayed. The detailed view may provide an option to see what collaboration groups the business object is already stored in. Further, the detailed view may provide options for creating a new collaboration group around that business object if one has not already been formed, or sharing to an existing collaboration group. The detailed view may also provide the option, in the alternative, to navigate to a previously created collaboration group for the business object. Once a user selects an option to navigate to another collaboration group, a similar interface to that displayed in connection with the first collaboration group will be displayed. That is, the user will be able to view related business objects to that around which the collaboration group was formed, as well as shared records which members of this second collaboration group deem to be sufficiently relevant to include in their collaboration group.

Note that, in some embodiments, collaboration system 110 may also provide a user the ability to reach this detailed view of a business object via an icon appearing in an activity feed of the collaboration environment, the business object icon appearing every time an action taken with regard to the business object is mentioned in the activity feed.

Further, in some embodiments, CRM system 140 may also provide a user with the ability to reach this detailed view of a business object through a business object icon appearing in a listing business objects 220, or, in the alternative, a business object icon appearing in activity feed 240 displayed in CRM system 140, that is displayed every time an action taken with regard to the business object is mentioned in the feed, for example.

As shown by FIGS. 4 and 5, in various embodiments, collaboration system 110 maintains information regarding the hierarchy of a business object of which a business object that the group was created from, is a part. This information is used to determine business object relationships and to form collection of business objects to present to a user in collaboration system 110.

The hierarchy is parallel to, and matches, the hierarchy of the original business object, and information regarding the hierarchy is obtained from metadata and data associated with the original business object.

Such information allows for the presentation of structured business object collections in the collaboration environment, the structure reflecting the structure of the data as it is stored in CRM system 140. The structure is also dynamic in the sense that as the relationship(s) change in the CRM system, they are updated in the collaboration system.

Further, as shown in FIGS. 4 and 5, mechanisms are provided for displaying key information regarding related business objects in quick view representations, creating new groups around those business objects, or navigating to groups previously formed around those related business objects. The same creating a new collaboration group, and navigating to an existing collaboration group, functionality may also be provided to shared business objects, the term "shared" used to connote that these records are added to the collaboration group on an ad hoc basis, by members of the group, for example, rather than through the object consumption definition (OCD) process described above for related business objects.

The above described features provide useful tools for working with business objects. These mechanisms provide a user with the ability to more easily identify, and if desired, navigate to business objects and collaboration groups which may be of interest to the user.

Figure 6:
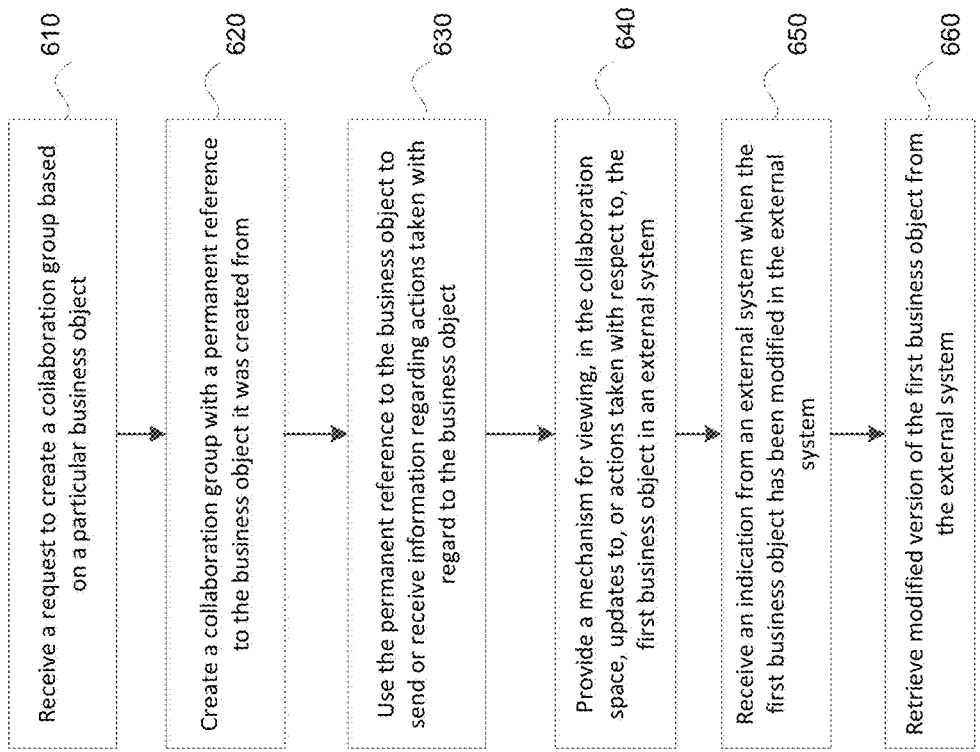
FIG. 6 is a flow diagram illustrating a procedure for integrating business objects from an external system into a collaboration environment in accordance with one embodiment of the present disclosure.

FIG. 6 is a flow diagram illustrating a procedure for creating a collaboration group around a business object where the collaboration system sends and receives communications to the external system from which the business object was obtained, to provide and receive updates concerning the business object, in accordance with one embodiment of the present disclosure. It will be understood that the sequence of steps depicted in FIG. 6 is intended to provide one example embodiment. Other embodiments with a different sequence of steps, or with particular steps left out, may still reflect the spirit behind various embodiments of the present disclosure.

In step 610, a request to create a group based on a particular business object is received, the request containing the business object as well as metadata relating to the record. In alternative embodiments, the request may not include the business object and associated metadata, and the business object and metadata may need to be retrieved in a separate step. Further, a user may select a "create group" option to create a group based on the business object in any of a variety of different contexts as further described herein.

In step 620, a collaboration group is created with a permanent reference to the business object it was created from. The permanent reference may identify the location of the business object in an external system where the business object was created. The permanent reference may be stored in a local data store associated with the collaboration system in some embodiments.

In step 630, the permanent reference to the business object is used to send or receive information regarding actions taken with regard to the business object. In some embodiments, the use of the permanent reference enables ongoing communications to be sent between the collaboration system and the external system, and allows for updates regarding actions taken with respect to the business object to be exchanged.

In step 640, a mechanism is provided for viewing, in the collaboration space, updates to, or actions taken with respect to, the first business object. In this step, in some embodiments, once information regarding actions taken regarding the business object in the external system are received, the information is displayed to a user in a user interface of the collaboration system.

In step 650, an indication is received from an external system when the first business object has been modified in external system 140. Such indication is an example of the type of updating information that may be exchanged between the collaboration system and the external system.

In step 660, the modified version of the first business object is retrieved from the external system. In some embodiments, the first business object is retrieved using the permanent reference for the first business object. That is, in some embodiments, when a user of the collaboration system wishes to access the first business object, the first business object is retrieved from the external system using the permanent reference. In other embodiments, the first business object may be stored in a local data store of the collaboration system. In this case, where a user wished to access the first business object, it could be retrieved directly from the local data store. In this case, where the first business object was modified in the external system, a modified version of the first business object may be obtained from the external system, and used to replace the prior version of the first business object.

Figure 7:
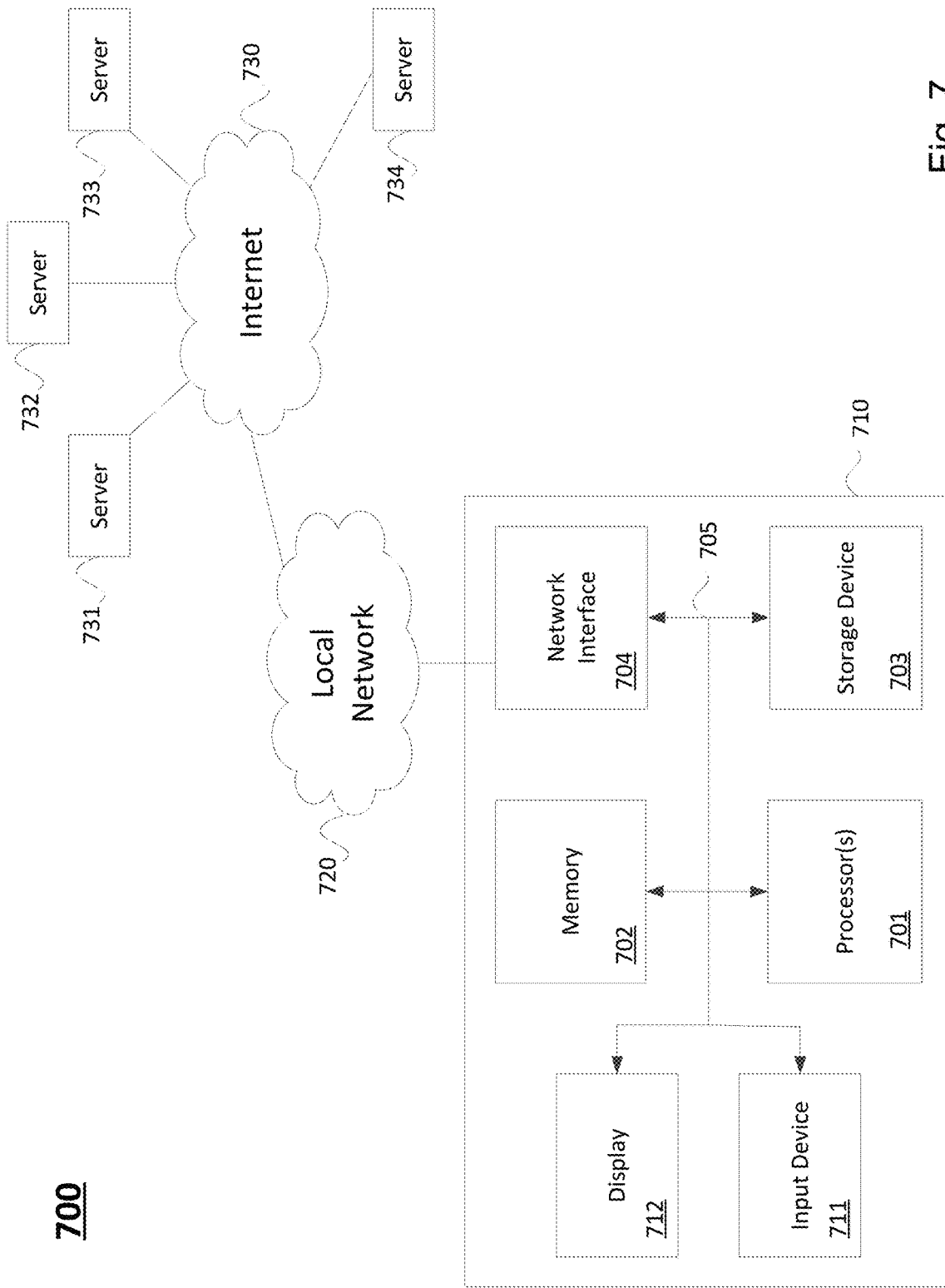
FIG. 7 is a block diagram illustrates hardware of a special purpose computing machine configured to perform a process in accordance with one embodiment of the present disclosure.

FIG. 7 illustrates hardware of a special purpose computing machine configured with a process according to the above disclosure. The following hardware description is merely one example. It is to be understood that a variety of computers topologies may be used to implement the above described techniques. An example computer system 710 is illustrated in FIG. 7. Computer system 710 includes a bus 705 or other communication mechanism for communicating information, and one or more processor(s) 701 coupled with bus 705 for processing information. One or more processor(s) 701 may take various forms including microcontrollers and microprocessors such as programmable devices (e.g., CPLDs and FPGAs) and unprogrammable devices such as gate array ASICs or general purpose microprocessors. Computer system 710 also includes a memory 702 coupled to bus 805 for storing information and instructions to be executed by processor 701, including information and instructions for performing some of the techniques described above, for example. This memory may also be used for storing programs executed by processor 701. Memory 702 may comprise a single or multiple storage components or devices. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 803 may include source code, binary code, or software files for performing the techniques above, for example. Storage device and memory may both include any suitable non-transitory computer-readable media such as those described herein. Memory 702 and storage device 703 may comprise a single or multiple memory or storage components or devices, respectively.

Computer system 710 may be coupled via bus 705 to an output device 712 for providing information to a computer user. Output device 712 may take the form of a display or speakers, for example. An input device 711 such as a keyboard, touchscreen, mouse, and/or microphone, may be coupled to bus 705 for communicating information and command selections from the user to processor 701. The combination of these components allows the user to communicate with the system. In some systems, bus 705 may represent multiple specialized buses, for example.

Computer system 710 also includes a network interface 704 coupled with bus 705. Network interface 704 may provide two-way data communication between computer system 710 and a local network 720. The network interface 804 may be a wireless or wired connection, for example. Computer system 710 may send and receive information through the network interface 804 across a local area network, an Intranet, a cellular network, or the Internet, for example. One example implementation may include computing system 710 acting as a server that performs steps relating to integrating a collaboration system with an application system. In the Internet example, computing system 710 may be accessed by the mobile devices through a wireless connection to the Internet, for example, and computing system 710 may access data and features on backend systems that may reside on multiple different hardware servers 731-735 across the network. Servers 731-735 and server applications may also reside in a cloud computing environment, for example. Various embodiments may be practiced in a wide variety of network environments including, for example, TCP/IP-based networks, telecommunications networks, cellular communications networks, wireless networks, etc., or combinations of different network types.

As noted above, the apparatuses, methods, and techniques described below may be implemented as a computer program (software) executing on one or more computers. The computer program may further be stored on a tangible non-transitory computer readable medium, such as a memory or disk, for example. A computer readable medium may include instructions for performing the processes described herein. Examples of such computer readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM).

In addition, the computer program instructions with which various embodiments of the present disclosure are implemented may be executed according to a variety of computing models including a client/server model, a peer-to-peer model, on a stand-alone computing device, or according to a distributed computing model in which various functions described herein may be performed at different locations.

The above description illustrates various embodiments of the present disclosure along with examples of how aspects of various embodiments of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of various embodiments of the present disclosure as defined by the claims.

What is claimed:

1. A method comprising:
    retrieving by a computing device, Open Data standardized data of a first data structure;
    creating, by the computing device from the Open Data standardized data, a reconstructed hierarchy mirroring a hierarchy of the first data structure;
    determining, by the computing device, a first object consumption definition for an object type corresponding to the first data structure;
    applying, by the computing device, the first object consumption definition to the Open Data standardized data to determine from the reconstructed hierarchy another data structure having a relationship to the first data structure;
    creating, by the computing device, a first collaboration group around the first data structure, the first collaboration group including the another data structure; and
    applying, by the computing device, a second object consumption definition to the Open Data standardized data to determine a second collaboration group based upon the creation of the first collaboration group.

2. The method of claim 1, wherein the another data structure is of a first object type; and
    further comprising:
        associating further data structures of the first object type with the first collaboration group.

3. The method of claim 2, further comprising:
    providing a listing of one or more object type categories, each object type category associated with one or more data structures included in the first collaboration group;
    wherein each of the object type categories is associated with an icon that when selected provides a view of data structures included in a selected object type category.

4. The method of claim 2, further comprising:
    determining from the reconstructed hierarchy, a data structure of a second object type that has a relationship to the first data structure, wherein the data structure of the second object type is determined to be related to the first data structure by applying the first object consumption definition; and
    associating the data structure of the second object type with the first collaboration group.

5. The method of claim 1, further comprising:
    providing a listing including the first data structure and the another data structure, the listing including for each data structure an icon which when selected provides a quick view of a selected data structure.

6. The method of claim 5, further comprising:
    providing a navigate icon in the quick view that when selected navigates to another collaboration group for the selected data structure.

7. The method of claim 5, further comprising:
    providing a share icon in the quick view that when selected associates the selected data structure with another collaboration group.

8. The method of claim 5, further comprising:
    providing a create icon in the quick view that when selected creates a new collaboration group around the elected data structure.

9. The method of claim 5, wherein the quick view identifies one or more collaboration groups associated with a selected complex data structure, and wherein the quick view provides a navigate icon for each collaboration group that when selected navigates to a selected collaboration group.

10. The method of claim 1, comprising:
    providing a quick view of a selected data structure, the quick view providing both a create icon and a navigate icon, the create icon when selected creating a new collaboration group around the selected data structure, and the navigate icon when selected navigates to the selected data structure.

11. The method of claim 1, further comprising:
    providing an activity feed of actions taken by members of the first collaboration group, the activity feed including, for each action relating to a data structure, a quick view icon for the data structure that when selected provides a quick view of the data structure.

12. The method of claim 1, further comprising:
    displaying the one or more related data structures according to visual layout determined by a template associated with the first object consumption definition.

13. A computer system comprising:
    one or more processors; and
    a non-transitory computer readable medium having stored thereon one or more programs, which when executed by the one or more processors, causes the one or more processor to singly or in combination:
        retrieve Open Data standardized data of a first data structure;
        create from the Open Data standardized data, a reconstructed hierarchy mirroring a hierarchy of the first data structure;
        determine a first object consumption definition for an object type corresponding to the first data structure;
        apply the first object consumption definition to the Open Data standardized data to determine from the reconstructed hierarchy another data structure having a relationship to the first data structure;
        create a first collaboration group around the first data structure, the first collaboration group including the another data structure; and apply a second object consumption definition to the Open Data standardized data to determine a second collaboration group based upon the creation of the first collaboration group.

14. The computer system of claim 13, wherein:
the another data structure is of a first object type; and
the non-transitory computer readable medium further having stored thereon one or more programs, which when executed by the one or more processors, causes the one or more processor to:
associate further data structures of the first object type with the first collaboration group.

15. The computer system of claim 14, wherein the non-transitory computer readable medium further having stored thereon one or more programs, which when executed by the one or more processors, causes the one or more processor to singly or in combination:
determine from the reconstructed hierarchy a data structure of a second object type that has a relationship to the first data structure, wherein the data structure of the second object type is determined to be related to the first data structure by applying the first object consumption definition; and
associate the data structure of the second object type with the first collaboration group.

16. The computer system of claim 14, wherein the non-transitory computer readable medium further having stored thereon one or more programs, which when executed by the one or more processors, causes the one or more processor to singly or in combination:
display the another data structure according to visual layout determined by a template associated with the first object consumption definition.

17. The computer system of claim 13, wherein the non-transitory computer readable medium further having stored thereon one or more programs, which when executed by the one or more processors, causes the one or more processor to singly or in combination:
provide a listing first data and the another data structure, the listing including for each data structure an icon which when provides a quick view of a selected data structure;
provide a create icon in the quick view that when selected creates a new collaboration group around the selected data structure; and
provide a navigate icon in the quick view that when selected navigates to another collaboration group for the selected data structure.

18. The computer system of claim 17, wherein the quick view identifies one or more collaboration groups associated with the selected data structure, and wherein the quick view provides a navigate icon for each collaboration group that when selected navigates to a selected collaboration group.

19. The computer system of claim 17, wherein the non-transitory computer readable medium further having stored thereon one or more programs, which when executed by the one or more processors, causes the one or more processor to singly or in combination:
provide a listing of one or more object type categories, each object type category associated with one or more data structures included in the first collaboration group;
wherein each of the object type categories is associated with an icon that when selected provides a view of the data structures included in the selected object type category.

20. A non-transitory computer readable storage medium storing one or more programs, the one or more programs comprising instructions when executed by one or more processors cause a system to:
retrieve Open Data standardized data of a first data structure;
create from the Open Data standardized data, a reconstructed hierarchy mirroring a hierarchy of the first data structure;
determine a first object consumption definition for an object type corresponding to the first data structure;
apply the first object consumption definition to the Open Data standardized data to determine from the reconstructed hierarchy another data structure having a relationship to the first data structure;
create a collaboration group around the first data structure, the collaboration group including the another data structure; and
apply a second object consumption definition to the Open Data standardized data to determine a second collaboration group based upon the creation of the first collaboration group.

* * * * *